(No Model.)
F. M. DUNN, A. PETTICORD & J. H. KING.
ELECTRICAL CIRCUIT CLOSER FOR WATER INDICATORS.
No. 409,460. Patented Aug. 20, 1889.
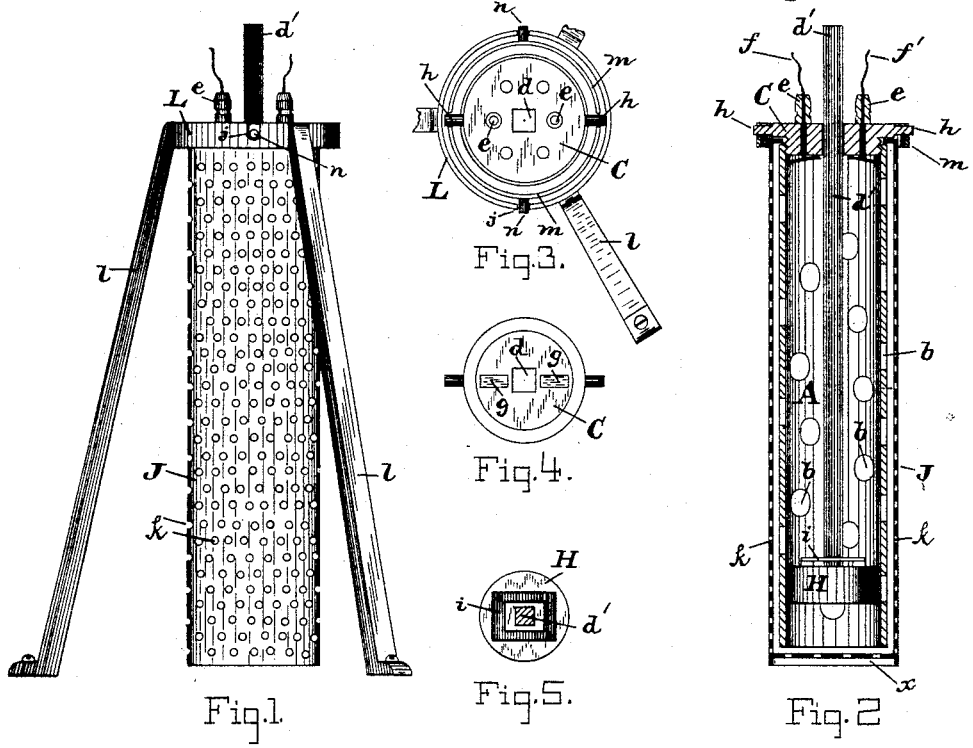
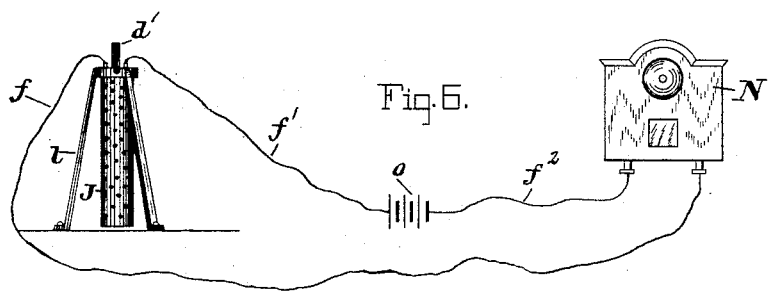
WITNESSES:
A. O. Balendrien.
John E. Morris.
INVENTORS:
F. M. Dunn
A. Petticord
J. H. King
BY Chas. B. Mann
ATTORNEY.

UNITED STATES PATENT OFFICE.

FRANKLIN M. DUNN, ALPHONZA PETTICORD, AND JOSEPH H. KING, OF BALTIMORE, MARYLAND.

ELECTRICAL CIRCUIT CLOSER FOR WATER-INDICATORS.

SPECIFICATION forming part of Letters Patent No. 409,460, dated August 20, 1889.

Application filed March 22, 1889. Serial No. 304,349. (No model.)

*To all whom it may concern:*

Be it known that we, FRANKLIN M. DUNN, ALPHONZA PETTICORD, and JOSEPH H. KING, citizens of the United States, residing at Baltimore, in the State of Maryland, have invented certain new and useful Improvements in Electrical Circuit Closers for Water-Indicators, of which the following is a specification.

This invention relates to an electrical water-indicator, and is shown in the accompanying drawings, in which—

Figure 1 is a side view of the indicator device. Fig. 2 is a vertical section of the same. Fig. 3 is a top view of the device. Fig. 4 is an under side view of the cap. Fig. 5 is a top view of the float. Fig. 6 is a view showing the water-indicator device, the annunciator, battery, and wire-connections.

The letter A designates a tubular case, made of hard rubber, glass, or any poor conductor. This case has in its sides holes or perforations $b$, and a cap C closes the upper end. This cap may be secured by a screw-thread or other means, and has a central hole $d$, which is square or polygonal in shape. The cap has on its outer or top side binding-posts $e$, for the connection of wires $f\,f'$, and on its inner side is provided with metallic (platinum) contact-points $g$. The cap also has two trunnions $h$. A float H, of cork, light wood, or other suitable material, is in the tubular case, and is free to move up or down. It has a square or other polygonal stem $d'$, which projects through the square hole $d$ in the cap and serves as a guide for the float. The float also has a platinum contact-plate $i$, which will make contact with the points $g$ on the cap.

The tubular case A is surrounded by a sheet-copper jacket J, perforated with holes $k$, smaller than those in the case. This copper jacket has a bottom $x$ and acts as a protector and strainer for the case A.

A suitable stand or bracket device is employed to stay and support the tubular case and keep it in position. This device, in the present instance, has a ring L, provided with two bearings $j$ and supported on legs or standards $l$. A gimbal-ring $m$ has trunnions $n$, which set in the bearings $j$ of the supporting bracket-ring L, and the cap-trunnions $h$ set on the gimbal-ring. By this manner of supporting the case A provision is made for tilting or inclining from a perpendicular. The legs may be fastened wherever it is desired to locate the water-indicator device.

An annunciator N may be located in any convenient position, and also a battery $o$. One of the wires $f$ connects one of the binding-posts $e$ with the annunciator and the other wire $f'$ with the battery, while a wire $f^2$ connects the battery with the annunciator.

If the water-indicator A be secured on the inside of the hull of a vessel at the bottom, it will serve to indicate the presence of water whenever water enough has accumulated in the hull to raise the float and make contact.

This device may be employed in tanks or in any situation, and may be used to indicate a low state of water, high water, or to indicate the presence of water when in places where there should be none.

Some features of construction shown in the drawings may be altered or varied to suit the particular use to which the device may be applied.

Having described our invention, we claim—

1. The combination of a tubular case A, provided with perforations $b$, binding-posts for the wires, and contact-points $g$, a float movable in the case and provided with contact-pieces, a supporting-ring L, and a gimbal-ring connecting the said case and supporting-ring.

2. The combination of a tubular case A, provided with perforations $b$, binding-posts for the wires, and contact-points $g$, a float movable in the case and provided with contact-pieces, a perforated jacket around the case, a support for the device, and a gimbal-ring connecting the said case and support.

In testimony whereof we affix our signatures in the presence of two witnesses.

FRANKLIN M. DUNN.
    ALPHONZA PETTICORD.
    JOSEPH H. KING.

Witnesses:
 JOHN E. MORRIS,
 JNO. T. MADDOX.